US008296211B2

(12) United States Patent
Dunne

(10) Patent No.: US 8,296,211 B2
(45) Date of Patent: Oct. 23, 2012

(54) METHOD OF ANALYZING INVESTMENTS USING STANDARDIZED PERFORMANCE MEASUREMENTS

(75) Inventor: Richard C. Dunne, Honolulu, HI (US)

(73) Assignee: Bdellium, Inc., Honolulu, HI (US)

( * ) Notice: Subject to any disclaimer, the term of this patent is extended or adjusted under 35 U.S.C. 154(b) by 103 days.

(21) Appl. No.: 12/461,789

(22) Filed: Aug. 25, 2009

(65) Prior Publication Data

US 2009/0327157 A1 Dec. 31, 2009

Related U.S. Application Data

(63) Continuation of application No. 10/501,326, filed as application No. PCT/US03/05808 on Jan. 24, 2003, now Pat. No. 7,590,582.

(60) Provisional application No. 60/350,969, filed on Jan. 25, 2002.

(51) Int. Cl.
*G06Q 40/00* (2006.01)
(52) U.S. Cl. .......................... 705/36 R; 705/35; 705/37
(58) Field of Classification Search ................ 705/36 R, 705/37, 38, 39, 35, 36 T
See application file for complete search history.

(56) References Cited

U.S. PATENT DOCUMENTS

| | | | | |
|---|---|---|---|---|
| 5,774,881 | A * | 6/1998 | Friend et al. ................. | 705/36 R |
| 6,055,517 | A * | 4/2000 | Friend et al. ................. | 705/36 R |
| 6,219,650 | B1 * | 4/2001 | Friend et al. ................. | 705/36 R |
| 6,453,303 | B1 | 9/2002 | Li | |
| 6,564,191 | B1 * | 5/2003 | Reddy ......................... | 705/36 R |
| 2002/0032630 | A1 * | 3/2002 | Peng et al. .................... | 705/36 |
| 2002/0038271 | A1 * | 3/2002 | Friend et al. ................... | 705/36 |
| 2002/0038273 | A1 | 3/2002 | Wherry et al. | |
| 2002/0147671 | A1 | 10/2002 | Sloan et al. | |

OTHER PUBLICATIONS

Anonymous "S&P intros enhanced electronic stock reports covering 4,600 U.S. equity issues" May 1995, Information Today, V12N5, pp. 72.*
Shein, Jay L. "67" Jun. 1, 1998, Financial Planning,pp. 1.*
Anonymous, "CVA Licenses Unique Compaq Technology for Its New 'Vectors for Managers' Software" Jul. 20, 1998, Businesswire, p. 1.*
Longo, Tracey "Fee Adviser—Stock-Pickers in the House: As America's bull market turns up the appeal of individual stocks, firms are hiring their own talent." Apr. 1, 2000, Financial Planning, pp. 1.*
Welsh, James "Seeking Shelter: Planners have a number of mutual fund options that offer decent returns and reduced volatility" Sep. 1, 2000, Financial Planning, p. 1.*
Kaufman and Rousseeuw, *Finding Groups in Data: An Introduction to Cluster Analysis*, Brussels, Belgium, A Wiley-Interscience Publication, Mar. 1990, pp. 68-125 and 312-319.

* cited by examiner

*Primary Examiner* — Kelly Campen
(74) *Attorney, Agent, or Firm* — Posz Law Group, PLC

(57) ABSTRACT

A process for the analysis and selection of financial investments based on a comparative analysis of performance and diversification. Large data sets can be manipulated in a manner that is simple to understand and convenient to use. Historical performance data for investments can be analyzed in respect of every possible investment period using any pre-existing or personally defined quantitative measurement algorithm. The user can apply his or her personal weightings to the various performance measurements based on a combination of attribute and time period to construct a customized scoring process, based on which a comparative ranking of the investments can be created. Further, a complete universe of investments can be segmented into peer groups based on one of a number of similarity/dissimilarity criteria from which the user may choose.

31 Claims, 10 Drawing Sheets

|  | 1-year Simple Average Return | 3-year Simple Average Return | 5-year Simple Average Return | 7-year Simple Average Return | 10-year Simple Average Return | New Method |
|---|---|---|---|---|---|---|
| Fund | 82.36% | 30.65% | 16.02% | 14.52% | 15.00% | 7.62% |
| Index | -30.97% | 1.98% | 9.71% | 13.28% | 11.92% | 17.46% |

Fig. 1

| Length of Holding Period in Months | 1 | 2 | 3 | 4 | 5 | 6 | 7 | 8 | 9 | 10 | 11 | 12 |
|---|---|---|---|---|---|---|---|---|---|---|---|---|
| No. of Holding Periods | 12 | 11 | 10 | 9 | 8 | 7 | 6 | 5 | 4 | 3 | 2 | 1 |
| 1-mon. Return (%) | | | | | Annualized, Continuously Compounded Return (%) | | | | | | | |
| Jan | 3.14 | 37.65 | | | | | | | | | | |
| Feb | 2.08 | 24.92 | 31.28 | | | | | | | | | |
| Mar | 2.54 | 30.53 | 27.72 | 31.03 | | | | | | | | |
| Apr | 3.35 | 40.16 | 35.34 | 31.87 | 33.31 | | | | | | | |
| May | 3.26 | 39.18 | 39.67 | 36.62 | 33.70 | 34.49 | | | | | | |
| Jun | 0.85 | 10.17 | 24.68 | 29.84 | 30.01 | 28.99 | 30.43 | | | | | |
| Jul | 6.22 | 2.68 | 6.43 | 17.34 | 23.05 | 24.54 | 24.61 | 26.47 | | | | |
| Aug | 3.07 | 36.86 | 19.77 | 16.57 | 22.22 | 25.81 | 26.60 | 26.36 | 27.77 | 27.39 | | |
| Sep | 2.03 | 24.41 | 30.64 | 21.32 | 18.53 | 22.66 | 25.58 | 26.28 | 26.11 | 26.67 | | |
| Oct | 2.6 | 31.16 | 27.79 | 30.81 | 23.78 | 21.06 | 24.08 | 26.37 | 26.89 | 27.77 | | |
| Nov | -12.28 | 9.44 | 14.43 | 20.04 | 16.57 | 15.5 | 18.88 | 21.54 | 22.54 | 22.78 | 24.13 | 25.90 |
| Dec | 4.78 | 57.16 | 22.44 | 25.35 | 25.11 | 27.46 | 23.33 | 21.45 | 23.67 | 25.50 | 26.00 | 26.88 |

Fig. 2

| Measurement | Start Date | End Date | Minimum Holding Period | Maximum Holding Period | Weight |
|---|---|---|---|---|---|
| Weighted Average of Return efor Overlapping Holding Periods | 4/1997 | 3/2002 | 1 month | 60 months | 50% |
| Weighted Average of Volatility efor Overlapping Holding Periods | 4/1999 | 3/2002 | 1 month | 36 months | 30% |
| Probability of Loss Based on Overlapping Holding Periods | 4/1999 | 3/2002 | 1 month | 36 months | 20% |

Fig. 4

| Group | Scoring Profile |
|---|---|
| Group 1 | Return (50%); Volatility (30%); Probability of Loss (20%) |
| Group 2 | Return (20%); Volatility (80%) |
| Group 3 | Probability of Loss (100%) |
| Etc. | |

| INVESTMENT | RETURN (WEIGHT = 70%) | | | PROBABILITY OF LOSS (WEIGHT = 30%) | | | OVERALL SCORE | | |
|---|---|---|---|---|---|---|---|---|---|
| | RAW (%) | NORMALIZED | SCORE (%) | RAW (%) | NORMALIZED | SCORE (%) | RAW | NORMALIZED | SCORE (%) |
| FUND A | 16.70 | 1.11 | 100.00 | 25.53 | (0.17) | 63.13 | 0.83 | 0.95 | 100.00 |
| FUND B | 10.89 | (0.28) | 28.46 | 14.56 | (0.90) | 100 | 0.08 | 0.09 | 56.54 |
| FUND C | 8.58 | (0.83) | 0.00 | 44.29 | 1.08 | 0.00 | (0.90) | (1.04) | 0.00 |

FIG. 7

| INVESTMENT | RETURN (WEIGHT = 30%) | | | PROBABILITY OF LOSS (WEIGHT = 70%) | | | OVERALL SCORE | | |
|---|---|---|---|---|---|---|---|---|---|
| | RAW (%) | NORMALIZED | SCORE (%) | RAW (%) | NORMALIZED | SCORE (%) | RAW | NORMALIZED | SCORE (%) |
| FUND A | 16.70 | 1.11 | 100.00 | 25.53 | (0.17) | 63.13 | 0.45 | 0.52 | 93.95 |
| FUND B | 10.89 | (0.28) | 28.46 | 14.56 | (0.90) | 100.00 | 0.55 | 0.63 | 100.00 |
| FUND C | 8.58 | (0.83) | 0.00 | 44.29 | 1.08 | 0.00 | (1.00) | (1.15) | 0.00 |

| Weighted Average of Correlations | 0.4849919 | | | | | | | | | | | | |
|---|---|---|---|---|---|---|---|---|---|---|---|---|---|
| Length of Holding Period (in months) | | 2 | 3 | 4 | 5 | 6 | 7 | 8 | 9 | 10 | 11 | 12 | |
| | Investment B | Investment E | | | | | | | | | | | |
| Month | MonthlyReturn | | | | | | | | | | | | |
| 1 | -1.34% | -3.92% | | | | | | | | | | | |
| 2 | 6.72% | -0.66% | 1.00 | | | | | | | | | | |
| 3 | 4.03% | -2.12% | 1.00 | 0.99 | | | | | | | | | |
| 4 | 3.78% | 2.06% | (1.00) | (0.25) | 0.60 | | | | | | | | |
| 5 | 1.26% | 0.50% | 1.00 | (0.23) | (0.31) | 0.45 | | | | | | | |
| 6 | 0.97% | 1.53% | (1.00) | 0.69 | (0.40) | (0.47) | 0.27 | | | | | | |
| 7 | 5.67% | 3.94% | 1.00 | 0.94 | 0.91 | 0.29 | (0.02) | 0.45 | | | | | |
| 8 | 3.24% | 3.05% | 1.00 | 0.99 | 0.92 | 0.88 | 0.28 | (0.05) | 0.43 | | | | |
| 9 | -0.54% | 0.38% | 1.00 | 0.99 | 0.99 | 0.94 | 0.91 | 0.34 | 0.05 | 0.40 | | | |
| 10 | 0.38% | 1.36% | 1.00 | 0.99 | 0.99 | 0.99 | 0.93 | 0.90 | 0.32 | 0.03 | 0.35 | | |
| 11 | 0.68% | 0.13% | (1.00) | 0.09 | 0.88 | 0.94 | 0.94 | 0.91 | 0.89 | 0.36 | 0.07 | 0.35 | |
| 12 | 1.16% | 0.86% | 1.00 | (0.28) | 0.21 | 0.86 | 0.93 | 0.93 | 0.91 | 0.89 | 0.36 | 0.08 | 0.35 |

Fig. 8

|  | Investment A | Investment B | Investment C | Investment D | Investment E | Investment F |
|---|---|---|---|---|---|---|
| Investment A | 1.0000 |  |  |  |  |  |
| Investment B | Corr$_{ba}$ | 1.0000 |  |  |  |  |
| Investment C | Corr$_{ca}$ | Corr$_{cb}$ | 1.0000 |  |  |  |
| Investment D | Corr$_{da}$ | Corr$_{db}$ | Corr$_{dc}$ | 1.0000 |  |  |
| Investment E | Corr$_{ea}$ | 0.4849919 | Corr$_{ec}$ | Corr$_{ed}$ | 1.0000 |  |
| Investment F | Corr$_{fa}$ | Corr$_{fb}$ | Corr$_{fc}$ | Corr$_{fd}$ | Corr$_{fe}$ | 1.0000 |

Fig. 9

METHOD OF ANALYZING INVESTMENTS USING STANDARDIZED PERFORMANCE MEASUREMENTS

CROSS REFERENCE TO RELATED APPLICATION

This application is a continuation of U.S. application Ser. No. 10/501,326 which was filed on Jul. 22, 2004, now U.S. Pat. No. 7,590,582, which is a 371 of PCT/US2003/05808 filed on Jan. 24, 2003.

TECHNICAL FIELD

The present invention relates generally to financial investment analysis, and, more specifically, to processes for selecting financial investments based on a comparative analysis of performance and diversification.

BACKGROUND ART

The principal selection criteria for investments that will constitute an investment portfolio are performance and diversification.

Although there is no guarantee that past performance patterns will be repeated in the future, it is considered desirable to avoid investments the historical performance of which has failed to meet some minimum criteria or has been unstable or inconsistent.

In any market conditions we can expect that some investments will perform well and others will perform badly. The concept of risk diversification is to construct a multi-investment portfolio so that under all market conditions some combination of good performers will always offset the under-performers and the portfolio consistently achieves its objectives.

Performance

Quantitative performance data tends to begin by showing average return based on different variations of the underlying data, e.g., total return, load-adjusted return or tax-adjusted return. The data may also include other standard performance measures such as volatility, semi-variance, drawdown, Sharpe ratio or Sortino ratio together with proprietary measures specific to the particular database provider. Perhaps the most widely recognized examples of the latter would be the Star Rating for mutual funds published by Chicago-based Morningstar, Inc. or the Timeliness Ranking for stocks published by New York-based Value Line In the case of mutual funds and other collective investment programmes, a second set of performance data is based on the performance attribution and style analysis approach favoured by institutional investors. The goal of performance attribution and style analysis is to divide a fund manager's returns into two parts—style and skill. Style is the part of the returns that is attributable to market movements and is dominated by the asset class mix in a portfolio. Skill is the part unique to the manager and is usually associated with individual security selection decisions within each asset class.

This analysis is usually accomplished through the construction of regression-based models, an approach that has evolved from the pioneering work of William Sharpe who first developed the Capital Asset Pricing Model. The models try to measure the systematic, causal relationship between the price performance of a fund and the movement in one or more market indexes. The measure of a fund's systematic relationship with a market index is called its 'Beta' while that portion of a fund's return that has no systematic relationship to the specified market indexes is called its 'Alpha'. Although theoretically this is not correct, Alpha is often interpreted as representing the skill of the manager and used to rank manager performance.

Most analytical software today calculates the average performance of an investment over a specific term, e.g., the most recent 1, 3, or 5 years, selected calendar years, or since inception. In addition, many analytical tools compare investments by showing how much $10,000 would have grown over a specific term. Most consumers believe that these simple averages and growth graphs reflect the results that would have been achieved for any shorter sub-period, or holding period, within the specified term. However, analysis by the inventor shows that this is often not the case, and the discrepancy can be very large. Thus, there is a need for a better measurement that can capture not only performance during a single term but also the consistency of performance for all holding periods within that term.

The quantitative criteria commonly used to compare performance are measured in many different units and the range of values can very greatly. For example, return and volatility are both measured in percentages, but returns can be positive or negative whereas volatility can only be non-negative. In contrast, Sharpe ratio and correlation are both measured in integers, but Sharpe ratio is unbounded, whereas correlation must always take a value between −1 and 1. Typically, many software applications for analyzing investments provide multiple fields with different performance measurements for comparison among investments, but offer no methodology or technical capability to combine multiple criteria into a single composite result. Where ranking capability on single criteria is provided, the most common form of ranking is percentiles or simple ordinal rank. The limitation of this measurement is that it provides no information about the scale of difference in the relative performance of the ranked investments. Thus, there is a need for better investment analysis tools including a single score that allows easy comparison of investment performance.

Diversification

Mutual funds are most commonly grouped by applying a pre-defined classification system to their underlying holdings. The classification systems are usually based on a combination of geography (US, Europe, Latin America, Pacific/Asia, Japan), sector (Communications, Financial, Health etc.) and style (large-cap, mid-cap, small-cap, value, growth, balanced) for equities and duration (long term, intermediate, short-term) or tax status (taxable, non-taxable) for bonds. Thus Morningstar Inc., mentioned above, defines four main groupings that are further subdivided into 48 categories. The Investment Funds Standards Committee of Canada defines five main grouping that are sub-divided into 33 categories.

Under the style analysis approach, the simplest form of regression model identifies the single index with which the fund's performance is most closely related (this is sometimes referred to as the 'best-fit index') and funds can be grouped based on this criterion.

The investment strategies pursued by most mutual funds and 'traditional' institutional investment management programmes are usually subject to restrictions on shorting securities or applying leverage and the investment manager is often constrained to buying and holding assets in a few well-defined asset classes. These buy-and-hold strategies lend themselves to the two principal grouping methods described above.

In recent years however there has been an explosion of investment in hedge funds that employ considerably more sophisticated and dynamic trading strategies in pursuit of absolute returns with no systematic relationship to the general market. These funds may employ a very wide range of techniques (including shorting and leverage), may trade in all markets (defined by asset type as well as geography) and use a diverse range of trading instruments (including futures, swaps, options and other financial derivative contracts).

Because time series of performance data is very limited, because these funds generally do not disclose detailed position information, and because of the dynamic nature and complexity of their trading strategies, traditional holdings-based or style analysis methods can not be extended to these funds.

(Extensive efforts are being made to apply style analysis methods to the performance of hedge funds but these efforts face many technical problems in the construction of appropriate indexes and as yet there are no generally accepted standards.)

A third grouping method has therefore been developed for this class of funds, based primarily on a description of the manager's strategy rather than the characteristics of the fund's holdings. Examples or of such descriptors are as follows: Long/Short Equity Hedge; Short-Only; Event Driven; Distressed Situations; Merger Arbitrage; Convertible Arbitrage; Fixed Income Arbitrage; Capital Structure Arbitrage; Credit Arbitrage; Mortgage-Backed Securities; Market Neutral; Relative Value; Global Macro; Emerging Markets; and Currency.

Many of these descriptors do not have standard definitions and many funds employ multiple strategies in multiple markets, making it difficult to assign them to a single category. Therefore, although a strategy-labeling approach is widely used the resulting classification systems have not yet coalesced into a generally accepted common format.

DISCLOSURE OF THE INVENTION

This invention consists of methods that constitute a unique process for the analysis of financial investments based on a comparative analysis of performance and diversification.

In this context, "investments" includes any financial asset or group of financial assets in respect of which it is possible to trade based on generally accepted and regularly available periodic valuations and non-tradable indices and benchmarks. Such investments may include, but are not limited to, individual securities (such as stocks or bonds), collective investment vehicles (such as mutual funds, closed-end funds, hedge funds, or commodities funds), specialist financial contracts (variable annuities or financial derivative contracts), real estate, or any combination thereof. However, in order to simplify the material we will focus our discussion and examples primarily on mutual funds and funds pursuing absolute return strategies (which we shall refer to generically as "hedge funds"), although analogous issues arise with other investments.

This invention is unique in a number of respects, namely that:

The apparatus and methods permit the manipulation of extremely large data sets in a manner that is simple to understand and convenient to use.

This invention permits historical performance data for investments to be analyzed in respect of every possible investment period using any pre-existing or personally defined quantitative performance measurement algorithm. (This process is hereinafter referred to as "Multi-Period Analysis").

The user can apply his or her personal weightings to the various performance measurements based on a combination of attribute and time period to construct a customized utility function, based on which a comparative ranking of the Instruments can be created. (This process is hereinafter referred to as "Scoring"); and This invention permits the complete universe of investments to be segmented into peer groups based on one of a number of similarity/dissimilarity criteria from which the User may choose. (This process is hereinafter referred to as "Grouping").

The invention is basically a method for analyzing the performance of a plurality of investments. The method includes: using a data source from which can be derived the percentage increase or decrease in the value of each investment during each of consecutive reporting periods within a given time frame; calculating values of an investment performance measurement for a plurality of overlapping holding periods within the time frame, respectively; and using the resulting values to judge the desirability of each investment.

The investments are each a tradable asset or a portfolio of tradable assets or a non-tradable index or benchmark.

Each reporting period is of the same standard length of time.

The investment performance measurement includes any quantitative measurement of the absolute performance of a single investment or any quantitative measurement of its performance relative to that of another investment.

Each holding period is a period of time spanned by any combination of consecutive, contiguous reporting periods, such that the length of a holding period is a multiple of the standard length of the reporting period.

In another aspect, the method includes, for each investment, calculating a weighted average of the values of the investment performance measurement and comparing the respective weighted averages of the investments.

The weighting factor to be applied to the value in respect of each holding period may be selected by a user, but, in the absence of such determination, by default shall be based on the length of the holding period associated with each performance measurement value.

In another aspect, the method includes: calculating a weighted average of the correlation between each pair of investments for a plurality of holding periods; performing a mathematical conversion on the weighted average of correlation values such that these values are mapped into a range of positive values in which a higher positive value reflects a greater degree of negative correlation between the investments; and using such converted or mapped values to partition the investments into groups such that the investments in each group are more highly correlated with each other than with those in any other group.

In another aspect, the method includes calculating the percentage of all designated holding periods in which the performance measurement for an investment was more desirable than a fixed reference value or that of another investment.

In another aspect, the invention includes calculating values of a plurality of performance measurements for the plurality of holding periods for each investment; calculating a weighted average of the values of the performance measurements; calculating in respect of each weighted average its standardized value, which is the number of standard deviations such weighted average lies above or below the mean of all weighted averages, for each performance measurement for the investments; for each investment, calculating a weighted average of the standardized values for each performance measurement; and performing a mathematical conversion on the resulting weighted averages such that the highest resulting weighted average is mapped to one-hundred percent, the lowest is mapped to zero percent and all other values are mapped within this range accordingly.

The weighting factor to be applied to each standardized value may be selected by the user but, in the absence of such determination, by default shall equal a fraction, the numerator of which equals one and the denominator of which equals the number of performance measurements being averaged.

In another aspect, in respect of any performance measurement value where a lower value is more desirable, the method includes multiplying the corresponding stored standardized value by a factor of negative one prior to calculating a weighted average of the standardized values.

In another aspect, the method includes storing the values of the performance measurement for each of the investments in a database prior to using the values to judge the desirability of each investment.

In another aspect, the method includes storing the weighted averages for each of the investments in a database prior to using the values to judge the desirability of each investment.

In another aspect, the method includes: calculating values of a plurality of performance measurements for the plurality of holding periods for each investment; for each investment, calculating the percentage of all holding periods in which the performance measurement for an investment was more desirable than a fixed reference value or that of another investment; calculating a normalized value for each percentage outperformance value, wherein the normalized value is the number of standard deviations such percentage outperformance lies above or below the mean of all outperformance values, for each of the investments; for each performance measurement, calculating a weighted average of the normalized values for each investment; and performing a mathematical conversion on the resulting weighted averages such that the highest resulting weighted average is mapped to one-hundred percent, the lowest is mapped to zero percent and all other values are mapped within this range accordingly.

In another aspect, the method includes making an investment decision based on the results of the analysis.

In another aspect, the method includes calculating a probability of loss value by counting the number of the holding periods for which the return was negative and dividing the total by the number of the holding periods.

In another aspect, the method includes calculating the percentage of holding periods in which the value of a designated performance measurement for one investment is more desirable than a designated fixed value or than the value of the same performance measurement for another investment In another aspect, the performance measurement is a value representing the return of each investment.

BRIEF DESCRIPTION OF THE DRAWINGS

FIG. 1 is a table showing the performance of a fund and an index when measured using traditional single periods and using the new multi-period analysis;

FIG. 2 is a table showing the returns on an investment for overlapping holding periods;

FIG. 4 is a table showing a scoring profile;

FIG. 5 is a table showing various scoring profiles for several groups;

FIG. 6 is a table showing an overall score for three investments for a selected weighting of performance measurements;

FIG. 7 is a table showing an overall score for three investments for a selected weighting of performance measurements;

FIG. 8 is a table showing correlations between a pair of investments;

FIG. 9 is a table showing weighted averages of correlations for multiple pairs of investments;

BEST MODE FOR CARRYING OUT THE INVENTION

Multi-Period Analysis

Figure 3:
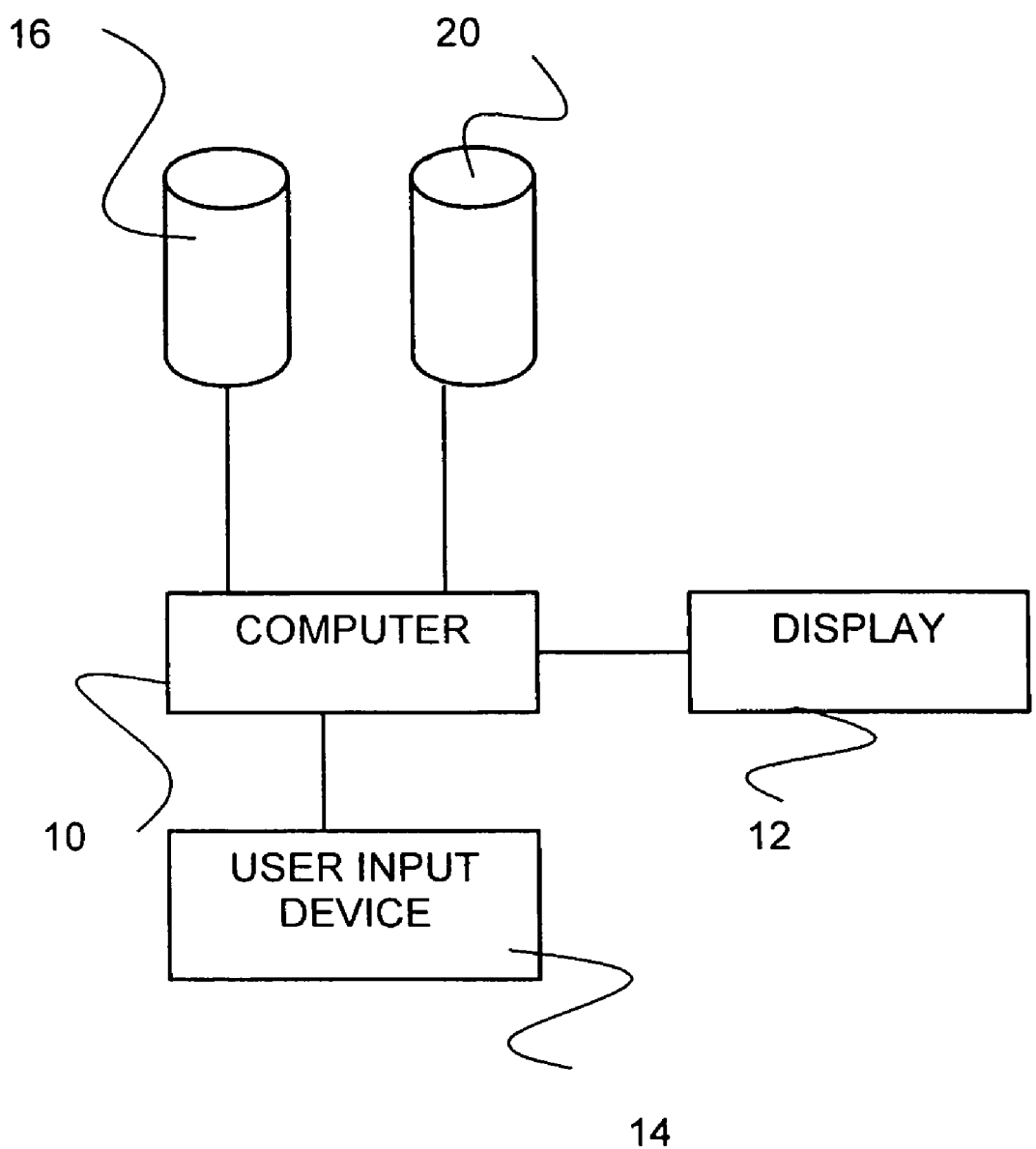
FIG. 3 is a diagram of a computer and databases for implementing the method of the invention.

One of the biggest difficulties facing an investor who seeks to select a number of mutual funds using currently available performance analytics is that performance measurements are provided for only a limited number of discrete periods.

Typically performance indicators such as return, volatility or the Sharpe ratio are calculated for periods of one, three, five, seven and ten years, measured by calendar year or trailing from a recent month or quarter-end. In addition the period from inception to the present is often included. Alpha and Beta calculations are similarly based on one or perhaps two specific periods such as three or five years.

A major difficulty with this approach is that these average numbers can be misleading and can lead to mistaken selection because they fail to adequately reflect the true performance history of a fund. For example, the table of FIG. 1 represents actual performance data for a US-based fund and compares it to the performance of the S&P500 Index. This table shows that the fund out-performed the S&P500 Index in each of the one-, three, five, seven- and ten-year periods ending September, 2001, which would seem to recommend it as a good candidate for investment. Using one of the leading mutual fund databases it was possible to identify 29 US domestic mutual funds that outperformed the S&P500 Index in each of these periods and also for a fifteen-year period. Again this performance would seem to recommend these funds for investment.

This invention however uses a different approach that provides greater depth and accuracy of analysis than is currently available. This is the Multi-Period Analysis Algorithm. The method of this invention takes the performance data in whatever frequency is available (in this case monthly) between the dates in respect of which a comparison is required (October 1991 to September 2001 inclusive in the case of this example) and calculates the annualized return that would have been earned by an investor in every possible sub-period, or holding period, between these dates. Thus there were 120 separate holding periods of one month each, 119 holding periods of two months each, 118 holding periods of three months etc. down to two holding periods of 119 each and a single holding period of 120 months. In this example, the total number of holding periods in respect of which the apparatus calculates returns is 7,260. A weighted average of all these results is then calculated. The method permits the user to select their preferred weighting method. In this example, the weighting used equals the length of the relevant holding period expressed in months. The result for the S&P500 Index, as shown in the table of FIG. 1 is 17.46% and for the sample fund is 7.62%. Based on these results, an investor might well decide not to invest in the fund.

The holding periods are called overlapping holding periods because, two periods of the same length, for example, the period spanning January, February, and March and the period spanning February, March and April have two months in common. Thus, the holding periods overlap.

How can we explain the sharply different results of using a few discrete periods and using the comprehensive method incorporated into this invention? During the eighteen-month period ending September 2001 the fund outperformed the index by a spectacular 92.71% per annum. This was sufficient to ensure that the average fund performance, even spread over a ten-year period, exceeded the average for the index. In fact, however, the index actually outperformed the fund in 75% of all possible investment holding periods (5,435 out of the total of 7,260). The current state-of-the-art methods accurately reported the average result for a few discrete holding periods but failed to reflect the fact that most of the fund's performance was concentrated within a specific very short space of time within these longer periods. This invention, by examining all periods and applying a weighting ensures that such short-term aberrations do not dominate the comparative performance analysis.

Of course, in this extreme example, the extraordinary difference in performance for the one-year period would give a strong indication to an investor that further research would be advised. However, with more than 10,000 funds from which to choose, or even limited to the 29 funds mentioned above, it becomes impractical if not impossible to manually carry out such a detailed comparison or to draw useful conclusions when the effect is not so extreme. The value of this invention is that the multi-period analysis directly solves this problem.

The same multi-period analysis can be applied to any quantitative measure. In addition, not only can the average of the multi-period results be compared across investments, the results for any two investments may be compared for every single corresponding holding period. This capability dramatically extends current fund performance analysis systems by providing a deeper, more detailed and totally comprehensive analysis of a fund's historical performance.

In another example, the table of FIG. 2 shows a multi-period analysis table for an investment for which twelve months of data has been analyzed. FIG. 2 shows that a table of multi-period analysis results is wedge-shaped. In this example, the column labelled "Return" provides the actual, continuously compounded one-month return for the corresponding month. The values under the heading "Annualized, Continuously Compounded Return (%)" are the annualized, continuously compounded returns for the corresponding holding periods, which are given along the horizontal axis (top row of the table).

Note that the return in any cell is the return for a period ending at the end of the month indicated horizontally in the leftmost column. The length of the holding period associated with any return, as expressed in months in this example, is indicated vertically in the uppermost row. Thus, FIG. 2 shows that the annualized return for a five month holding period ending in July was 24.54%. The annualized return for the five-month holding period ending in August was 25.81%. Note that each holding period is a period of time spanned by any combination of consecutive, contiguous reporting periods, such that the length of a holding period is a multiple of the standard length of the reporting period. In the example of FIG. 2, the standard reporting period length is one month, and each holding period is a multiple of one month. If investing data were reported at weekly intervals, that is, if the reporting period were one week, the length of each holding period would be a multiple of one week, for example.

Investments may be analyzed simply by comparing the returns for the many overlapping holding periods. However, a preferred further step is to determine the weighted average of the values in the table after forming the multi-period return table. The weighting factor to be applied shall be defined by the user; however, in the absence of such a definition, the weighting factor shall be defined as follows: The numerator of the weighting factor is the length of the particular holding period. The denominator of the weighting factor is the same for all holding periods and equals the sum of a series of numbers. Each number is the product of the length of each holding period in months and the number of holding periods of that length. Using the table of FIG. 2 as an example, there are twelve holding periods of one month, eleven two-month holding periods, ten three-month holding periods, and so on. The number of holding periods of each length is given in the second row from the top in FIG. 2. Thus, the denominator of the weighting thus would be as follows:

$$(1\times12)+(2\times11)+(3\times10)+(4\times9)+\ldots+(9\times4)+(10\times3)+(11\times2)+(12\times1)=364$$

The weighted average multi-period return value for the investment of the table of FIG. 2 is thus 25.1982%.

The weighted average provides a single measurement that captures the level, range and ordering of periodic returns over time. This permits period-by-period comparative performance analysis among any combination of investments, including single securities, portfolios, assets such as real estate, or indices. Multi-period analysis is the only method by which one can answer the question "what would have been an investment result if one had randomly decided the holding period?" Multi-period analysis can test an investment manager's claim to have beaten the market "over the past n years." Further, the multi-period analysis provides insights into whether a specific investment has performed best over shorter or longer holding periods.

A similar table can be constructed with periodic return data for any investment, including an index or benchmark, and a weighted average multi-period return value can be calculated in the same manner. Thus, the weighted average multi-period return value for the investment of FIG. 2 can be compared to the other investments or indices or benchmarks to determine which is more desirable when compared on this basis.

Although the example of FIG. 2 uses return as the performance measurement, other return measurements such as volatility or Sharpe Ratio or any other quantitative performance measurement can be used as well. That is, the information that is input to prepare the table is periodic return data, but the entries in the table need not be return values. The entries in the table can be other values such as volatility or Sharpe Ratio or any other quantitative performance measurement.

Another way of judging investments based on the multi-period analysis is to calculate a probability of loss value for a given time frame. The probability of loss value is calculated by counting the number of holding periods within the time frame for which the percentage return is negative. This number is divided by the total number of overlapping holding periods within the time frame. The result is a probability of loss value that is useful in judging the performance of investments. A higher probability of loss is less favourable as an indicator of performance than a lower probability of loss.

A further way of judging investments based on the multi-period analysis is to calculate a percentage outperformance value, which is the percentage of holding period within a given time frame that an investment performance measurement for one investment was more desirable than either a designated absolute value or than that of the same performance measurement for another designated investment or index. This is a more general application of the method used in calculating probability of loss.

More specifically, with reference to the table of FIG. 2, suppose one wished to know the percentage of holding periods in which the return on a particular investment was greater than 15%. There are a total of 78 holding periods in the table of FIG. 2, and in 73 of those periods the return was greater than 15%. Thus, the percentage outperformance using 15% as the criterion is 73/78×100 or 93.6%. A table like that of FIG. 2 can be constructed for the S&P500 index for the same time period. The number of holding periods in which a particular investment outperformed the S&P500 index could be determined, and that number divided by 78 would give a percentage outperformance using S&P500 index outperformance as the criterion.

A further way of judging investments on the multi-period analysis is to calculate a weighted average volatility value. The weighted average volatility value is the weighted average of numbers that represent the volatility of an investment for every overlapping holding period within the given time frame. The result is useful for judging the volatility of investments.

When the method is incorporated in software, which is the preferred way of implementing the method, the software indicates to the user the common term for which data is available for all the investments the user wishes to compare. The user would then specify the desired start date, end date and minimum and maximum holding periods to be used.

Preferably, the multi-period analysis is performed by a computer using software that incorporates the method of the invention. Further, when the method is performed by a computer, the periodic investment data may be taken from public database such as TASS (a hedge fund performance database) or databases provided by the Center for Research in Security Prices (CRSP) or private databases. Tables like that of FIG. 2 can be pre-calculated for every investment within a source database before any investment analysis is done. This will normally make analysis faster when investments are selected for comparison or ranking.

One optional feature of the invention that speeds up analysis is that tables such as that of FIG. 2 are pre-calculated, as mentioned above, prior to any investment analysis. Many tables are pre-calculated and stored in a warehouse database, which is normally a local database but can also be accessed over a local area network or over the internet. For example, each pre-calculated table represents one investment and one performance measurement and records the performance measurement for every possible holding period between the earliest and the latest dates in respect of which return data is provided. Tables may be prepared for any quantitative measurement such as return, volatility, or Sharpe ratio and for correlations between pairs of investments. Thus, when there is a need to compare two investments or to rank many investments, the software need not calculate the performance measurement for each holding period. The software program needs only to refer to the appropriate cells of the appropriate table in the database.

FIG. 3 shows a computer 10, which includes a display 12 and a user input device 14. The computer 10 is connected to an investment history database (or databases) 16. The investment history database (or databases) 16 can be stored locally, can be on portable media, such as CD ROM, or accessed over a local area network or over the Internet. The computer 10 uses investment history data from the investment history database (or databases) 16 to populate a warehouse database 20, which includes pre-calculated tables. The pre-calculated tables contain, for example, among other things, multi-period return data for a universe of investments. The warehouse database may be stored locally or it may be accessed over a local area network or over the Internet. The computer 10 runs software that performs the multi-period analysis described above on the warehouse database. The user-interface of the computer 10, which is programmed to perform the method of this invention, indicates a common term for which investment data is available for all investments of interest. The user may specify the desired start date, end date, and minimum and maximum holding periods. The user also may select the performance measurement to be calculated from choices such as return, volatility, probability of loss, and Sharpe ratio. In addition, the interface permits many other parameters to be set by the user. The program provides numerical and graphical analysis of the results on the display.

Alternatively, the computer need not use pre-calculated tables and need not employ the warehouse database 20. All calculations can be done as needed from the history database 16.

Figure 10:
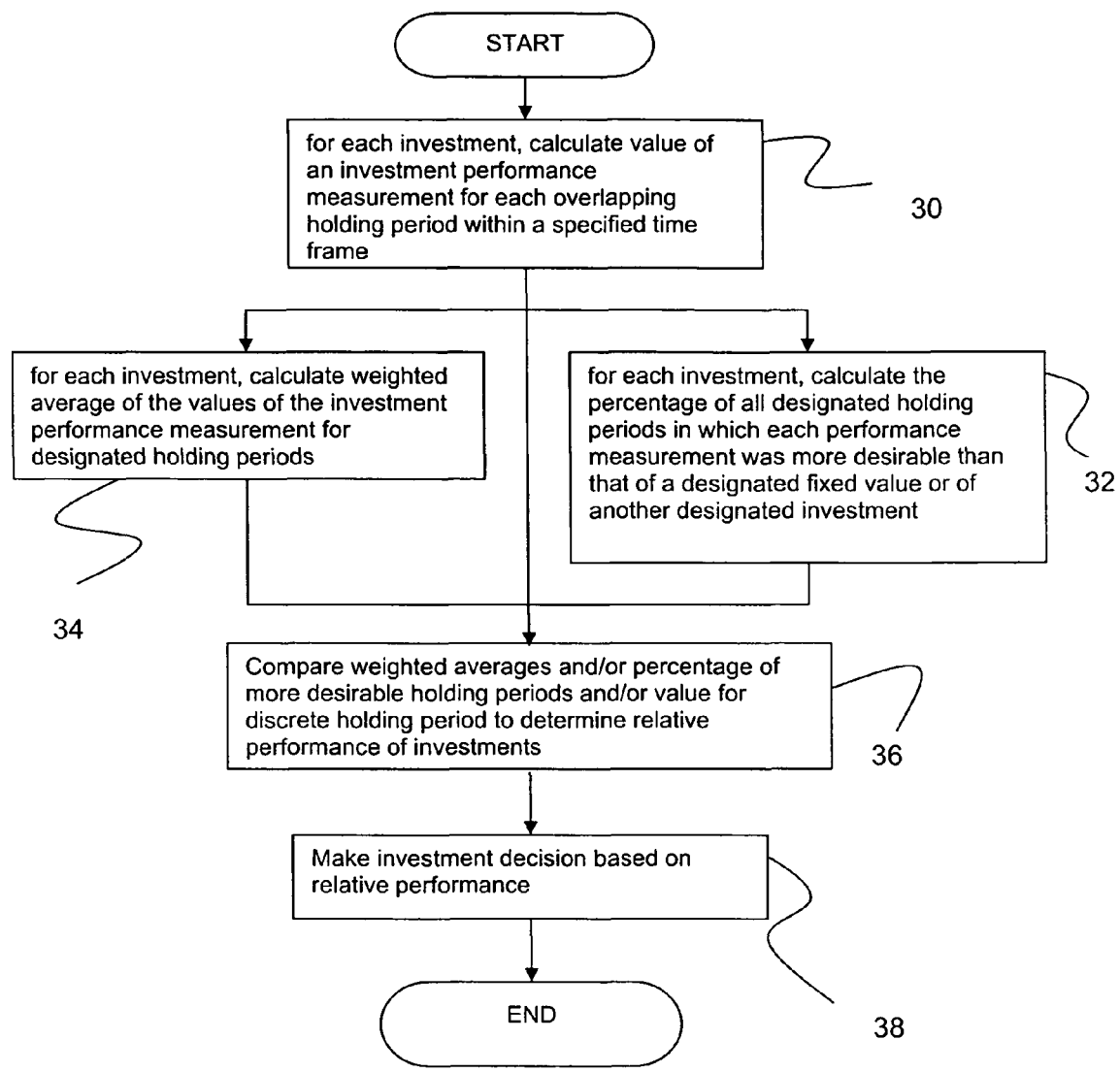
FIG. 10 is a simplified flow chart of a process of comparing investments.

FIG. 10 is a self-explanatory flow chart showing stages of an exemplary multi-period analysis in which investments are compared based on weighted averages and/or percentage of favourable holding periods. The steps of such a method depend on the user's goals and may be varied accordingly. Step 30 is the step of calculating a value of an investment performance measurement for each holding period. Steps 34 and 32 need not both be performed. Depending on the users goals, the user may perform one or both of steps 32 and 34 or may simply use single values for discrete holding periods from the values calculated in step 30. Step 36 is a comparison step. For example, if only step 34 is performed and not step 32, then in step 36, only the weighted averages would be compared to determine relative performance. If neither step 32 nor 34 is performed, and the user instead chooses to use the performance measurement from a discrete holding period, then step 36 is simply a step of comparing the values calculated in step 30 for the chosen holding period. Step 38 is a step of making an investment decision based on the comparison of step 36. For example, step 38 may include the purchase of shares in a stock that compared favourably in step 36.

Scoring Process

Most investors will select funds based on a number of criteria and each will have his or her personal view as to the relative importance of each criterion to the final decision. The leading tools available today provide a vast range of performance measurements and an investor may establish a fund's rank ordering based on any single criterion. However, it appears that, until now, no method has been available by which an investor can freely combine multiple criteria to create a unified rank ordering that reflects personal priorities. This invention provides just such functionality through scoring.

This feature of the method permits the user to specify the dates, between which the historical analysis will be applied, the range of multiple holding periods in respect of which the weighted performance measurement will be calculated (as described in the preceding section) and the criterion that will be applied to the selection process. Finally, the user specifies the relative importance of each selection criterion to the final decision. This may be expressed by a number of methods, including serial rank ordering or percentage weighting.

The method then includes producing a ranking for each fund in respect of each selection criterion. The ranking methodology is designed to make it independent of the units in which each criterion is measured. The method then includes generating a scoring profile that specifies the manner in which the criteria are to be combined in accordance with the relative importance ascribed by the user. The result of applying the scoring profile is to generate a single index with values between zero percent and one hundred percent and to assign an index value to each fund. The closer the index value is to one hundred percent the higher the ranking of the fund in terms of the user's personalized scoring process.

A different scoring profile can be defined for every group of investments within the defined universe. Each scoring profile might reflect, for example, the stated primary performance objectives of the group, e.g., high return or capital preservation.

For example, FIG. 4 shows a scoring profile table listing three performance measurements in the first column. The other columns show the start date, the end date, the minimum holding period, the maximum holding period and the weight, which are chosen by the user. The weight represents the weight given to the corresponding performance measurement. One such profile can be selected for each of a plurality of groups of investments, as shown in the table of FIG. 5.

FIG. 5 shows a table listing three groups in the first column. In the second column, a scoring profile for the corresponding group is given. The scoring profile is simply the combination of the designated performance measurements to be used for scoring and the weight, or subjective importance, as a percentage, given to each performance measurement. The sum of the weights must equal 100%.

The scoring process includes, for each group, calculating the raw value of each performance measurement specified in the scoring profile. Then, the mean and the standard deviation of the raw values across the group are calculated. In the case of the table of FIG. 4, the raw values are the weighted averages of three different measurements of performance. However, each raw value may be a percentage outperformance value, which was described above. That is, a percentage outperformance value may be used for each of the performance measurements. Other raw values that indicate performance may be selected by the user.

Then, for every investment, the scoring process includes counting the number of standard deviations the raw value is above or below the corresponding mean. This is called the standardized value. Standardized values have the statistical property that, irrespective of the units or measurement or the distribution of the underlying raw values, the corresponding standardized values have a mean of zero and a standard deviation of one.

For each investment, the user-specified weighting is applied to the standardized value for each measurement and a weighted average is calculated. This result is again standardized.

A score can be assigned in respect of a single criterion or to the weighted average of all criteria as follows. A score of 100% is assigned to the investment with the best standardized value within the group. A score if 0% is assigned to the investment with the worst standardized value within the group. For all other investments, the assigned score is as follows:

$$1 - \left\{\frac{BSV - SVIBS}{BSV - WSV}\right\} \times 100$$

where BSV stands for the best standardized value, SVIBS stands for the standardized value of the investment being scored, and WSV stands for the worst standardized score.

FIG. 6 shows sample results from the scoring process. FIG. 6 is a table for three investments and two performance measurements in which return is given a weight of 70% and probability of loss is given a weight of 30%. In this table, the three investments, Fund A, Fund B, and Fund C are scored with a single score according to the weighting for the two performance measurements. Values that are in parentheses are negative.

FIG. 7 is a table like FIG. 6. However, in FIG. 7, the performance measurement of return is weighted at 30% and probability of loss is given a weight of 70%. The change in score that results in the change of weighting can be seen in the rightmost column of the two tables, which gives the overall score. The scoring process is preferably implemented with a software program and performed by a computer 10, as described with reference to the multi-period analysis. The weightings and other user-selected variables are entered by a user using the user input device 14, when prompted by the user interface.

Figure 11:
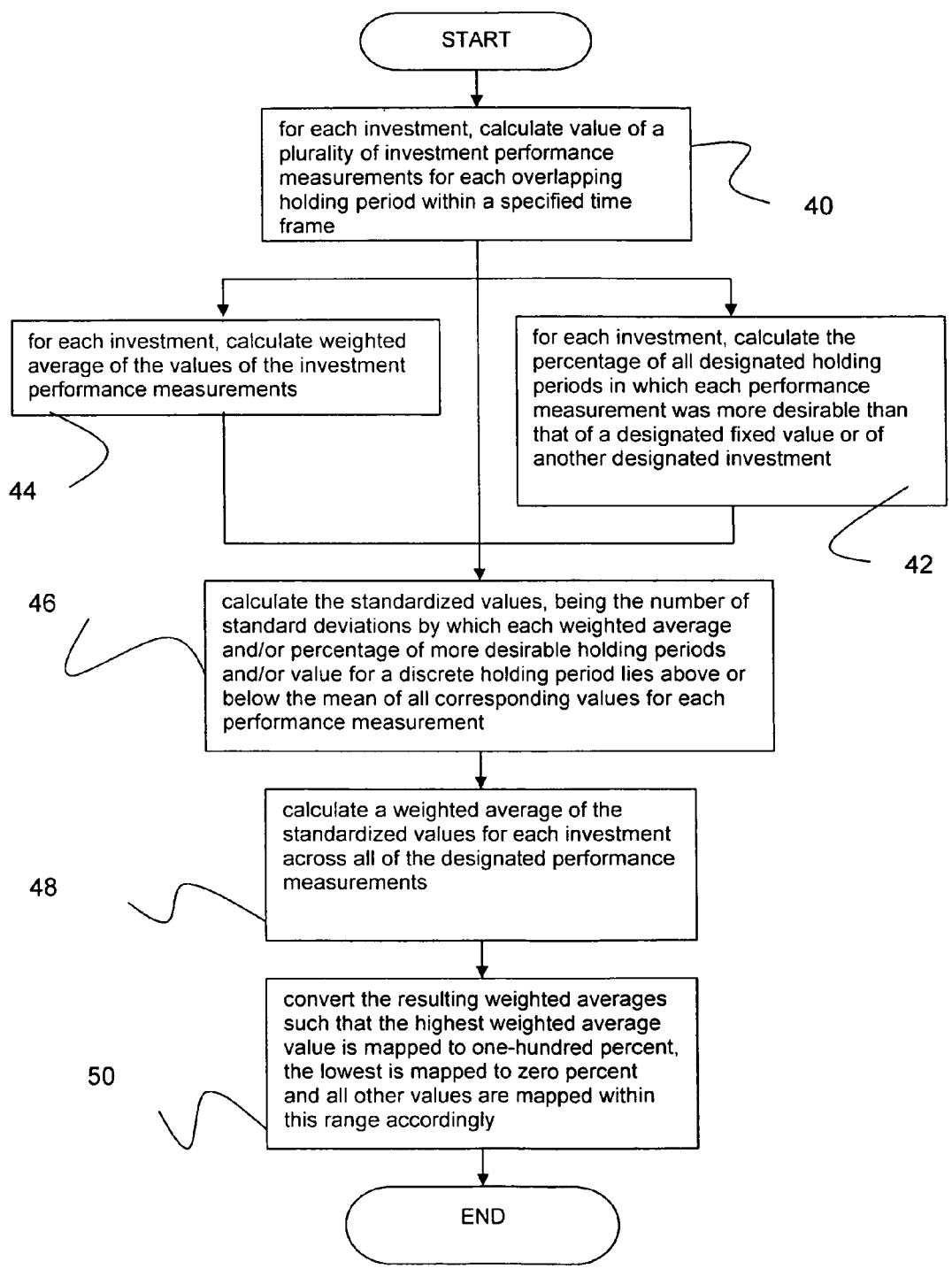
FIG. 11 is a simplified flow chart showing a scoring process.

FIG. 11 is a self-explanatory flowchart showing an exemplary procedure for scoring. In the procedure of FIG. 11, the scoring is based on weighted averages of a performance measurement or the percentage of favourable holding periods for a particular performance measurement. The steps of the scoring process will vary according to the user's goals but may be as shown in FIG. 11. Referring to FIG. 11, step 40 is the step of calculating investment performance measurements for each holding period. Either or both of steps 44 and 42 may be performed or the user may go directly to step 46 by choosing to use values calculated in step 40 for discrete holding periods. Step 44 is a step of calculating weighted averages of the investment performance measurements over the holding periods. Step 42 involves calculating a percentage outperformance, as described above. If only step 44 were performed and not step 42, for example, then in step 46, only the weighted averages would be used in calculating the number of standard deviations. If neither step 42 nor step 44 is performed, the user may simply in step 46 calculate the number of standard deviations based on the performance measurement values for a selected discrete holding period. In step 48, a weighted average of the standard deviation values is calculated for each investment and for each performance measurement. In step 50, the resulting weighted averages are mapped between zero and one hundred.

Grouping

Grouping methodologies that use portfolio holdings or strategy labels suffer from a number of weaknesses, including that they are not directly based on actual performance. Regression-based style analysis of course uses performance data but share other label-based shortcomings. In addition, many individual investors are less concerned about how closely their fund tracks an index than there are in achieving a fixed return objective, usually related to their life plan, such as funding children's education or providing for retirement. In addition, none of these state-of-the art approaches has yet been applied successfully across both mutual funds and hedge funds.

A common characteristic of current methods is that the number of groups into which the funds may be divided is fixed by the methodology and is not related directly to how many funds the investor wishes to select. This is a critical issue. For example, let us assume that one of the existing systems produces twenty-six categories. If an investor wants to select exactly twenty-six funds, then he or she might decide that picking one fund from each category will provide the highest degree of diversification. If however the investor wishes to invest in only twelve funds, ideally he or she would prefer to be able to reorganize all of the funds into just twelve groups with the highest possible diversification and again pick one from each group. Current methods have no algorithms to achieve such a regrouping.

This invention directly solves the problem using a performance-based peer grouping process. The preferred performance measurement used in this process is correlation, although the invention supports the use of other measurements. Correlation is a statistical technique that can show whether and how strongly pairs of variables are related. The sign of the correlation coefficient, which can be either positive or negative, defines the direction of the relationship. A positive correlation coefficient means that as the value of one variable increases, the value of the other variable increases; as one decreases the other decreases. A negative correlation coefficient indicates that as one variable increases, the other decreases, and vice-versa. Combining investments that have a negative correlation to each other is usually expected to produce a more stable return across different market environments.

It is relatively easy to work with correlation for small data sets. Therefore once the complete universe has been reduced to a relatively small number of funds selected for the final portfolio, correlation is an important element in all established methods for deciding what percentage of capital should be allocated to each investment—often referred to as portfolio optimization".

Because correlation is calculated directly from performance data and represents the systematic relationship among the investments, it is one of the best possible criteria for creating peer groups for risk diversification. However, there are a number of significant technical challenges in working with correlation data for a very large universe of funds. For example, a universe of 10,000 funds would create close to 50 million different pair-wise correlation coefficients so the scale of data alone might discourage investigation in this area.

This invention uses advanced partitioning techniques in a multi-stage process that can group any large universe of investments based on their pair-wise correlation or on other user-specified measures of similarity/dissimilarity based, for example on the absolute difference in returns between each pair of investments either in respect of a plurality of single performance reporting periods or in respect of a plurality of designated holding periods. The user may specify the number of groups into which the universe should be divided and this of course may be determined by the number of investments to be included in the portfolio. In addition, of course, the correlation coefficients or other measures may be calculated using the Multi-Period Analysis described above, or by any other method.

The grouping process implements a clustering methodology called "Partitioning Around Mediods" as detailed in chapter 2 of L. Kaufman and P. J. Rousseeuw, Finding Groups in Data: An Introduction to Cluster Analysis, Wiley, New York (1990).

In the preferred embodiment, a universe of investments is partitioned into a user-specified number of groups based on the correlation of historical performance between each pair of investments within the investment universe or other measurement of similarity/dissimilarity. The user can specify the number of groups. The correlation inputs are calculated using the multi-period analysis described above. The process can be applied to any combination of investments (stocks, bonds, mutual funds, hedge funds, indices, or benchmarks).

The process also allows the user to partition the investment universe using the data provider's labelling system and to compare the grouping results obtained from applying different grouping methodologies.

First, common start and end dates for all investments within the investment universe are determined. Then, for every pair of investments, the weighted average of the correlations over the overlapping holding periods within the common term is calculated. The holding periods are defined in the same manner as described above with respect to the multi-period analysis. Using the correlation values, the investment universe is divided into a specified number of groups such that the investments in each group are more highly correlated with each other than with those in any other group.

To divide the investment universe into the specified number of groups, dissimilarity values are employed. Each dissimilarity value is a single number that measures the degree of similarity or dissimilarity between two objects in the dataset. The lower the dissimilarity value, the more similar the two objects are, the higher the dissimilarity value, the more dissimilar the two objects are.

For each pair of investments being considered, that is, for each pair in the investment universe, the correlations are determined for designated multiple holding periods. If specific holding periods are not designated, the default is to begin with all holding periods of at least two reporting periods in length and end with the holding period the length of which equals the length of the common term. The table of FIG. 8 is an example of a table of such correlations for two investments, investment B and investment E. Because of the way correlation is calculated, the correlations will always lie between negative one and one. Therefore, the values in the cells of the table of FIG. 8 will always lie between negative one and one. The weighted average of the correlations of the table of FIG. 8 is 0.4849919, as indicated near the top of the table.

A weighted average of these correlations is calculated for each investment pair in the investment universe. The weighting factor can be selected by the user, but the default weighting factor is based on the length of each holding period, as described with respect to multi-period analysis above. The result can be arranged and displayed in a table like that of FIG. 9, which may be referred to as a pair correlation table, since it shows the correlations between pairs of investments. The term of the table of FIG. 9 is twelve months. Although most of the correlations in the pair correlation table of FIG. 9 are represented by the subscripted variable "Corr," the numerical value of the correlation between investments B and E, which is derived from the correlation table of FIG. 8, has been written in the pair table in the appropriate cell. In the pair correlation table of FIG. 9, $Corr_{xy}$ refers to the correlation between investment X and investment Y. The cell for $Corr_{eb}$ shows the correlation value calculated as the weighted average of correlation values for all holding periods of 2 months or longer during the 12-month term in respect of investment E and investment B according to the correlation table of FIG. 8. The table also shows that every investment's correlation with itself is one.

In this context, a correlation value of positive one indicates least dissimilarity, whereas a correlation value of negative one indicates greatest dissimilarity. The preferred process of partitioning around medoids (the process described by Kaufman and Rousseeuw mentioned above), however, is designed to work with positive values where higher values indicate greater dissimilarity. Therefore, after taking the weighted average, the correlations are converted to positive values. The positive values are the dissimilarity values mentioned above.

In other words, a mathematical conversion is performed on the correlation values such that negative values are mapped to positive values. In the preferred embodiment, a correlation value of negative one is mapped to two, a correlation value of one is mapped to zero, and all other correlation values are mapped within a range from zero to two accordingly. This is achieved by subtracting each value from one to generate a corresponding dissimilarity value; however, other similar conversions that produce positive numbers, such that a higher positive number denotes greater dissimilarity can be used.

The resulting dissimilarity values are used by software that incorporates Kaufman and Rousseeuw's partitioning method to group the investments into a specified number of groups such that the investments in each group are more highly correlated with each other than with those in any other group. Although the "Partitioning Around Medoids" method described by Kaufman and Rousseeuw is presently preferred, other methods that can partition the groups such that the investments in each group are more highly correlated with each other than with those in any other group may be used.

The resulting groups can be used to improve risk diversification. That is, the groups can be used to construct a portfolio of investments in which an investor may have greater confidence that under all market conditions, some combinations of good performers will likely offset the under-performers, and the portfolio will consistently achieve its objectives.

Figure 12:
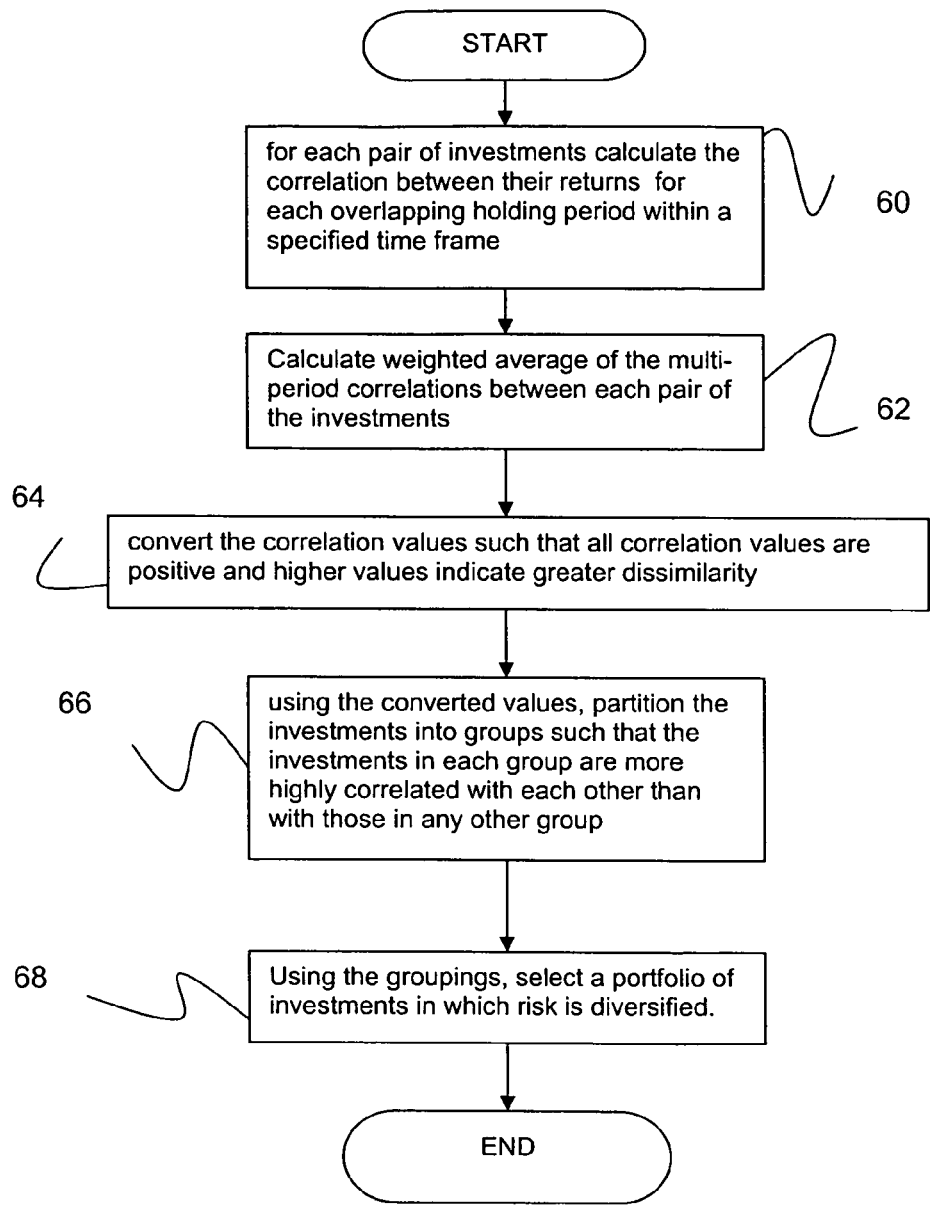
FIG. 12 is a simplified flow chart showing a grouping process.

FIG. 12 is a self-explanatory flow chart showing an exemplary grouping process. The steps will vary according to the user's goals but may be as shown in FIG. 12. Referring to FIG. 12, step 60 is the step of calculating the correlation between their returns for each pair of investments for each holding period within a given time frame. In step 62, the weighted average of the multi-period correlations between each pair of investments is calculated. The correlation values are converted to positive values such that higher positive numbers indicate greater dissimilarity in step 64. In step 66, the converted values are used to partition the investments into groups such that the investments in each group are more highly correlated with each other than with those in any other group. Step 68 involves choosing a portfolio of investments in which risk is diversified using the groups. More specifically, one would normally not choose investments that are all in the same group if diversity is a goal. Ideally, the portfolio would include investments from more than one group for diversification.

The grouping process is preferably implemented with a software program and performed by a computer 10, as described with reference to the multi-period analysis. The number of groups and other user-selected variables are entered by a user using the user input device 14, when prompted by the user interface.

A software process has been developed for implementing the Kaufman and Rousseeuw method of portioning. That process is referred to as the PAM (Partitioning Around Medoids) algorithm. The following is a detailed description of the PAM algorithm:

The PAM Algorithm has two stages, the Build Stage and the Swap Stage.

The purpose of the Build Stage is to identify a first set of Medoids equal to the desired number of groups.

In the Swap Stage all non-Medoid Objects are iteratively tested to see if they are better qualified than the existing selected Medoids. Usually, after each iteration of the process, one Candidate is selected to replace one existing Medoid. The process stops when no better qualified Candidate exists.

Glossary

A Candidate is an Object that has not yet been selected as a Medoid.

An Object is one of the members of the dataset being partitioned

A Test Object is the name given in the Swap stage to each Object in turn against which the swap test is applied.

DValue refers to the dissimilarity value mentioned earlier. It is a single number that measures the degree of similarity or dissimilarity between two Objects. The lower the DValue, the more similar the two Objects are. The higher the DValue, the more dissimilar the two Objects are.

DValue (Object a×Object b) refers to the DValue for the indicated pair of Objects.

DVector refers to the Dissimilarity Vector for a single Object. It contains the same number of elements, as there are Objects in the dataset and shows the respective Object's DValue compared to all other Objects (including itself).

Dz and DzSky are counters used in the Swap Stage (see below).

HDValue means the highest DValue across all of the DVectors for all of the Objects in the dataset.

A Medoid is the Object in a group that has the greatest similarity to all other Objects in the group. This means that the aggregate DValues for (Medoid×Each other Object in the group) is the lowest among group members.

RValues mean the values used in the RVector.

RVector refers to the Reference Vector that is used in the Build Stage to find Medoids. This vector has the same number of elements as there are Objects in the dataset, which is also the same number of elements in any Object's DVector.

Vector A is used in the Swap Stage. For each Object, the Medoid for which DValue (Object×Medoid) is lowest, i.e., the Medoid to which each Object is most similar, is identified. This is called the Object's Medoid A. Vector A consists of the DValues for each Object with its respective Medoid A.

Vector B is also used in the Swap Stage. For each Object, identify the Medoid for which DValue (Object×Medoid) is second lowest. This is called the Object's Medoid B. Vector B consists of the DValues for each Object with its respective Medoid B.

Build Stage

The purpose of the Build Stage is to identify the first group of Medoids. The number of Medoids will equal the final number of groups determined by the user.

To find the First Medoid:

Step 1: Create the first RVector. In the case of the first RVector, each element is given the same RValue which is arbitrarily calculated by the formula IRValue=(HDValue*1.1)+1.

Step 2: Select a Candidate and, one-by-one, subtract each DValue in the Candidates's DVector from the corresponding RValue in the RVector and sum all of the results.

Step 3: Repeat Step 2 for all Candidates. The Candidate with the highest accumulated total is selected as the first Medoid.

To find Subsequent Medoids:

Step 4: Calculate a new RVector. To construct the RVector to find subsequent Medoids, base the RVector upon the RVector used to identify the previous Medoid. For each Object in the Dataset, enter the lower of DValue (Object×Most Recently Identified Medoid) and the corresponding previous RValue within the prior iteration's RVector Step 5: Select a Candidate and one-by-one, we subtract each DValue in the Candidate's DVector from the corresponding RValue in the RVector selected in Step 4.

In respect of DValue (Candidate×Object b) the "corresponding" RValue would be the lower of DValue (Object b×Most Recently Identified Medoid) and DValue (Object b×Medoid identified one iteration before Most Recently Identified Medoid).

Sum only those differences that are positive. (Note: in the case of finding the First Medoid, by construction all the differences are positive so all are summed as stated in Step 2 above)

Step 6: Repeat Step 5 for all Candidates. The Candidate with the highest accumulated total is selected as the next Medoid.

Step 7: Repeat Steps 4-6 until we have identified the same number of Medoids (including the first Medoid) as the desired number of groups.

Swap Stage

Step 8: Construct Vectors A and B according to the Glossary description.

Step 9: Set DzSky=1

Step 10: Set Dz=0

Step 11: Select the First Candidate, the first Medoid and the first Test Object. Calculate:

D1=DValue (First Medoid×Test Object); and
D2=DValue (Candidate×Test Object)

Step 12: If D1=DValue (Test Object's Medoid A×Test Object),

Calculate

Min[$D$Value(Test Object's Medoid $B$×Test Object), D2]−$D$Value(Test Object's Medoid $A$×Test Object)

Accumulate to Dz
Else

If $D2<D$Value(Test Object's Medoid $A$×Test Object)

Calculate D2−DValue(Test Object's Medoid A×Test Object)

Accumulate to Dz
Else
Do not accumulate.

Step 13: Repeat Steps 9 and 10 for all Test Objects, without changing the First Candidate or the First Medoid.

The grand total is the Dz value for the First Candidate and the First Medoid

Step 14: If Dz<Dz Sky, then set DzSky=Dz and make a note of which Candidate and which Medoid it happens for.

Step 15: Repeat Steps 10-14 for the First Candidate and each Medoid, and thereafter for each Candidate and each Medoid combination, until every Candidate, Medoid, Test Object combination has been used.

Step 16: Finally we know which Candidate and Medoid pairing had the lowest Dz value so If this lowest Dz (the last DzSky value)<0 then replace Medoid with that Candidate.

Else

Don't replace.

Step 17: Repeat Steps 8-16 until no replacement is made (i.e., the last DzSky value is not <0).

This is one example of a computerized process for partitioning. As stated earlier, any process that can partition the groups such that the investments in each group are more highly correlated with each other than with those in any other group may be used While the above description is of the preferred embodiment of the present invention, it should be appreciated that the invention may be modified, altered, or varied without deviating from the scope and fair meaning of the following claims.

For example, tables of pre-calculated performance returns or other performance measurements are preferably used when analyzing investments; however, the performance measurements may be calculated only when needed, without the use of pre-calculated tables. In addition, the various multi-period values and the various steps in the processes described above may be may be used in different sequences or may be used in part but not in whole depending on the user's specific requirements.

The invention claimed is:

1. A method, related to the performance of a plurality of investments and implemented by a computer coupled to a database of investment data, the computer being programmed to perform the steps of the method, comprising:

determining by the computer, by referring to the database, initial values of a plurality of performance measurements for each of the plurality of investments;

calculating, by the computer, a first standardized value for each of the initial values of the plurality of performance measurements for each of the plurality of investments, wherein each first standardized value is a number of standard deviations that a value of a performance measurement deviates from a mean of all corresponding values of the performance measurement for all of the plurality of investments;

with respect to any particular performance measurement for which a lower initial value reflects a better performance, multiplying by the computer, corresponding first standardized values for that particular performance measurement by a factor of negative one;

for each of the plurality of investments, calculating by the computer a weighted average of corresponding first standardized values for each of the plurality of performance measurements as resulting weighted averages;

calculating a second standardized value for each of the resulting weighted averages, wherein each second standardized value is a number of standard deviations that a resulting weighted average deviates from a mean of all resulting weighted averages for all of the plurality of investments; and performing, by the computer, a mathematical conversion on the second standardized values, as an investment analysis, wherein a highest second standardized value is mapped to one hundred percent, a lowest second standardized value is mapped to zero percent, and any other second standardized values are mapped proportionally within a range from zero to one hundred percent accordingly.

2. The method of claim 1, wherein a weighting factor to be applied to each first standardized value is a fraction having a numerator equal to one and a denominator equal to a total number of standardized values being averaged.

3. The method of claim 1, wherein one hundred percent weighting is applied to a single first standardized value and zero percent weighting is applied to all other first standardized values.

4. The method of claim 1, wherein a weighting factor to be applied to each first standardized value is a percentage selected by a user such that the total of all applied weighting factors equals 100%.

5. The method of claim 1, wherein the plurality of performance measurements includes any quantitative measurement of absolute performance of an investment.

6. The method of claim 1, further comprising:
storing the initial values of the plurality of performance measurements for each of the plurality of investments in a database prior to calculating the first standardized value for each of the initial values.

7. The method of claim 1, further comprising:
storing the first standardized value for each of the initial values of the plurality of performance measurements for each of the plurality of investments in the database prior to calculating the weighted averages of corresponding first standardized values.

8. The method of claim 1, further comprising:
storing the resulting weighted averages in a database prior to calculating the second standardized values.

9. The method of claim 1, further comprising:
making an investment decision based on results obtained by performing the mathematical conversion on the second standardized values.

10. The method of claim 1, wherein
the plurality of performance measurements includes any quantitative measurement of performance of an investment relative to performance of a reference investment.

11. The method of claim 1, wherein
the plurality of performance measurements includes any quantitative measurement of performance of an investment relative to a fixed reference value.

12. The method of claim 1, wherein
the plurality of performance measurements includes any quantitative measurement of a characteristic of an investment.

13. The method of claim 1, wherein
the plurality of performance measurements includes any quantitative measurement of a utility value of one or more characteristics of an investment.

14. The method of claim 1, further comprising:
storing the second standardized values in a database prior to performing the mathematical conversion on the second standardized values.

15. A method, related to the performance of a plurality of investments and implemented by a computer coupled to a database of investment data, the computer being programmed to perform the steps of the method, comprising:
performing, by the computer, a conversion cycle, including
determining, by the computer, by referring to the database, a value of a performance measurement for each of the plurality of investments;
performing by the computer, a mathematical conversion on each value of the performance measurement for each of the plurality of investments, to produce a single set of post-conversion values of the performance measurement for each of the plurality of investments, as follows:
when decreasing values of the performance measurement reflects better performance, multiplying each value of the performance measurement for each of the plurality of investments by a factor of negative one,
converting a highest performance measurement value to one hundred percent,
converting a lowest performance measurement value to zero percent, and
converting a performance measurement value that is not the lowest performance measurement value and is not the highest performance measurement value into a particular performance measurement post conversion value that is in a range from zero to one hundred percent, and proportional to its pre-conversion position in a range between the lowest performance measurement value and the highest performance measurement value.

16. The method of claim 15, wherein
the performance measurement is any quantitative measurement of absolute performance of an investment.

17. The method of claim 15, further comprising:
storing the value of the performance measurement for each of the plurality of investments in the database prior to performing the mathematical conversion on each value of the performance measurement for each of the plurality of investments.

18. The method of claim 15, further comprising:
storing each value in the single set of post-conversion values of the performance measurement for each of the plurality of investments in the database prior to using each value in the single set of post-conversion values to rank each investment in the plurality of investments.

19. The method of claim 15, further comprising:
making an investment decision based on the investment analysis.

20. The method of claim 15, wherein
the performance measurement is any quantitative measurement of performance of an investment relative to performance of a reference investment.

21. The method of claim 15, wherein
the performance measurement is any quantitative measurement of performance of an investment relative to a fixed reference value.

22. The method of claim 15, wherein
the performance measurement is any quantitative measurement of a characteristic of an investment.

23. The method of claim 15, wherein
the performance measurement is any quantitative measurement of a utility value of one or more characteristics of an investment.

24. The method of claim 15, further comprising:
calculating, by the computer, as resulting weighted averages, for each of the plurality of investments, a weighted average across plural sets of post-conversion values determined by performing the conversion cycle on each of a plurality of performance measurements; and
performing a mathematical conversion on each resulting weighted average so that
a highest resulting weighted average value is converted to 100 percent,
a lowest resulting weighted average value is converted to zero percent, and
a resulting weighted average value that is not the highest resulting weighted average value and is not the lowest resulting weighted average value is converted to a weighted-average post-conversion value within a range from one hundred percent to zero that is proportional to a pre-conversion position of the resulting weighted average value that is not the highest resulting weighted average value and is not the lowest resulting weighted average value, in a corresponding range that is represented by the highest resulting weighted average value and the lowest resulting weighted average value.

25. The method of claim 24, wherein
the plurality of performance measurements includes any quantitative measurement of performance of an investment relative to performance of a reference investment.

26. The method of claim 24, wherein the plurality of performance measurement includes any quantitative measurement of performance of an investment relative to a fixed reference value.

27. The method of claim 24, wherein the plurality of performance measurements includes any quantitative measurement of a characteristic of an investment.

28. The method of claim 24, wherein the plurality of performance measurements is any quantitative measurement of a utility value of one or more characteristics of an investment.

29. The method of claim 24, wherein a weighting factor to be applied to every post-conversion value for each performance measurement in each of the plural sets of post-conversion values is a fraction, having a numerator equal to one and a denominator equal to a total number of sets of post-conversion values being averaged.

30. The method of claim 24, wherein a weighting factor to be applied to every post-conversion value for each performance measurement in each of the plural sets of post conversion values is a percentage selected by a user such that a total of all applied weighting factors equals 100%.

31. The method of claim 24, further comprising:
storing the resulting weighted averages in the database; and
ranking, by the computer, each investment based on the resulting weighted averages.

\* \* \* \* \*